(12) United States Patent
Bekas et al.

(10) Patent No.: US 9,558,156 B1
(45) Date of Patent: Jan. 31, 2017

(54) SPARSE MATRIX MULTIPLICATION USING A SINGLE FIELD PROGRAMMABLE GATE ARRAY MODULE

(71) Applicant: INTERNATIONAL BUSINESS MACHINES CORPORATION, Armonk, NY (US)

(72) Inventors: Costas Bekas, Horgen (CH); Alessandro Curioni, Gattikon (CH); Heiner Giefers, Langnau am Albis (CH); Christoph Hagleitner, Wallisellen (CH); Raphael C. Polig, Dietikon (CH); Peter W. J. Staar, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/949,937

(22) Filed: Nov. 24, 2015

(51) Int. Cl.
*G06F 17/16* (2006.01)

(52) U.S. Cl.
CPC .................... *G06F 17/16* (2013.01)

(58) Field of Classification Search
CPC ....................................... G06F 17/16
See application file for complete search history.

(56) References Cited

U.S. PATENT DOCUMENTS

| 7,337,205 | B2 * | 2/2008 | Sazegari | ................. | G06F 17/16 |
| | | | | | 708/607 |
| 2014/0108481 | A1 | 4/2014 | Davis et al. | | |

FOREIGN PATENT DOCUMENTS

| CN | 100449522 C | 1/2009 | |
| CN | 100465876 C | 3/2009 | |
| EP | 0517241 A2 * | 12/1992 | ........... G06F 7/5443 |

OTHER PUBLICATIONS

C-slowing: Wikipedia, the free encyclopedia "C-slowing," https://en.wikipedia.org/wiki/C-slowing; Moditified on Sep. 26, 2013, retrieved on Apr. 11, 2016; 2 pages.
deLorimier, Michael., et al. "Floating-Point Sparse Matrix-Vector Multiply for FPGAs," FPGA'05, Feb. 20-22, 2005; pp. 75-85.
Giefers, Heiner., et al. "Analyzing the energy-efficiency of dense linear algebra kernels by power-profiling a hybrid CPU/FPGA system," IEEE 2014; ASAP 2014: 978-1-4799-3609; pp. 92-99.
Zhuo, Ling., et al. "Sparse Matrix-Vector Multiplication on FPGAs," FPGA 2005: Feb. 20-22, 2005; ACM 1-59593-029-9/05/0002, 12 pages.

* cited by examiner

*Primary Examiner* — Chuong D Ngo
(74) *Attorney, Agent, or Firm* — Cantor Colburn LLP; Daniel Morris

(57) ABSTRACT

According to some embodiments, a computer-implemented method for performing sparse matrix dense matrix (SpMM) multiplication on a single field programmable gate array (FPGA) module comprising a k-stage pipeline is described. The method may include interleaving k-stage threads on the k-stage pipeline comprising a plurality of threads $t_0$ to $t_{k-1}$, wherein a first result of thread $t_0$ is ready one cycle after the first input of thread $t_{k-1}$ is fed into the pipeline, and outputting a result matrix Y.

15 Claims, 7 Drawing Sheets

SPARSE MATRIX MULTIPLICATION USING A SINGLE FIELD PROGRAMMABLE GATE ARRAY MODULE

BACKGROUND

The present disclosure relates to sparse matrix multiplication, and more specifically, to sparse matrix multiplication using a single field programmable gate array.

The aim for energy-efficient computer systems has spurred the trend towards heterogeneous computing and massively parallel architectures. Heterogeneous systems use graphics processing units (GPUs) and other types of co-processors to accelerate application hotspots.

One application hotspot includes sparse matrix-dense-matrix multiplication (SpMM), which is an arithmetic operation common to many computing applications and algorithms. SpMMs are used in stochastic matrix estimator (SME) algorithms that are applied in a diverse set of problems, such as, for example, material science problems concerned with finding the electronic density in Density Functional Theory (DFT), or in cognitive computing problems concerned with finding the importance of a node in a knowledge graph.

In conventional modern data centers systems, the SpMM operation may not perform optimally on current state-of-the-art hardware due in part to the speed of floating point operations per second. For example, floating point operations may be performed at a low single-digit percentage of peak-performance of a computing device in state of the art computing. Meanwhile, the energy consumption of the device is typically around 50-75% of its peak consumption. Consequently the SpMM operation may be extremely energy inefficient, and thus, may pose a significant financial challenge for large data-centers solving a large number of cognitive problems on expansive graphs.

SUMMARY

According to some embodiments, a computer-implemented method for performing sparse matrix dense matrix (SpMM) multiplication on a single field programmable gate array (FPGA) module comprising a k-stage pipeline is described. The method may include interleaving k-stage threads on the k-stage pipeline comprising a plurality of threads $t_0$ to $t_{k-1}$, wherein a first result of thread $t_0$ is ready one cycle after the first input of thread $t_{k-1}$ is fed into the pipeline, and outputting a result matrix Y.

According to other embodiments, a system for performing sparse matrix dense matrix (SpMM) multiplication is described. The system may include a single field programmable gate array (FPGA) module, and a k-stage pipeline operating on the FPGA module. The k-stage pipeline may be configured to process k-stage threads. The single FPGA module may be configured to interleave the k-stage threads on the k-stage pipeline comprising a plurality of threads $t_0$ to $t_{k-1}$, where a first result of thread $t_0$ is ready one cycle after the first input of thread $t_{k-1}$ is fed into the pipeline, and output a result matrix Y.

According to yet other embodiments, a non-transitory computer-readable storage medium is described. The non-transitory computer-readable storage medium may store executable instructions that cause a computer to perform, when executed by the computer, a method for performing sparse matrix dense matrix (SpMM) multiplication on a single field programmable gate array (FPGA) module. The method may include interleaving k-stage threads on the k-stage pipeline comprising a plurality of threads $t_0$ to $t_{k-1}$, wherein a first result of thread $t_0$ is ready one cycle after the first input of thread $t_{k-1}$ is fed into the pipeline, and outputting a result matrix Y.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
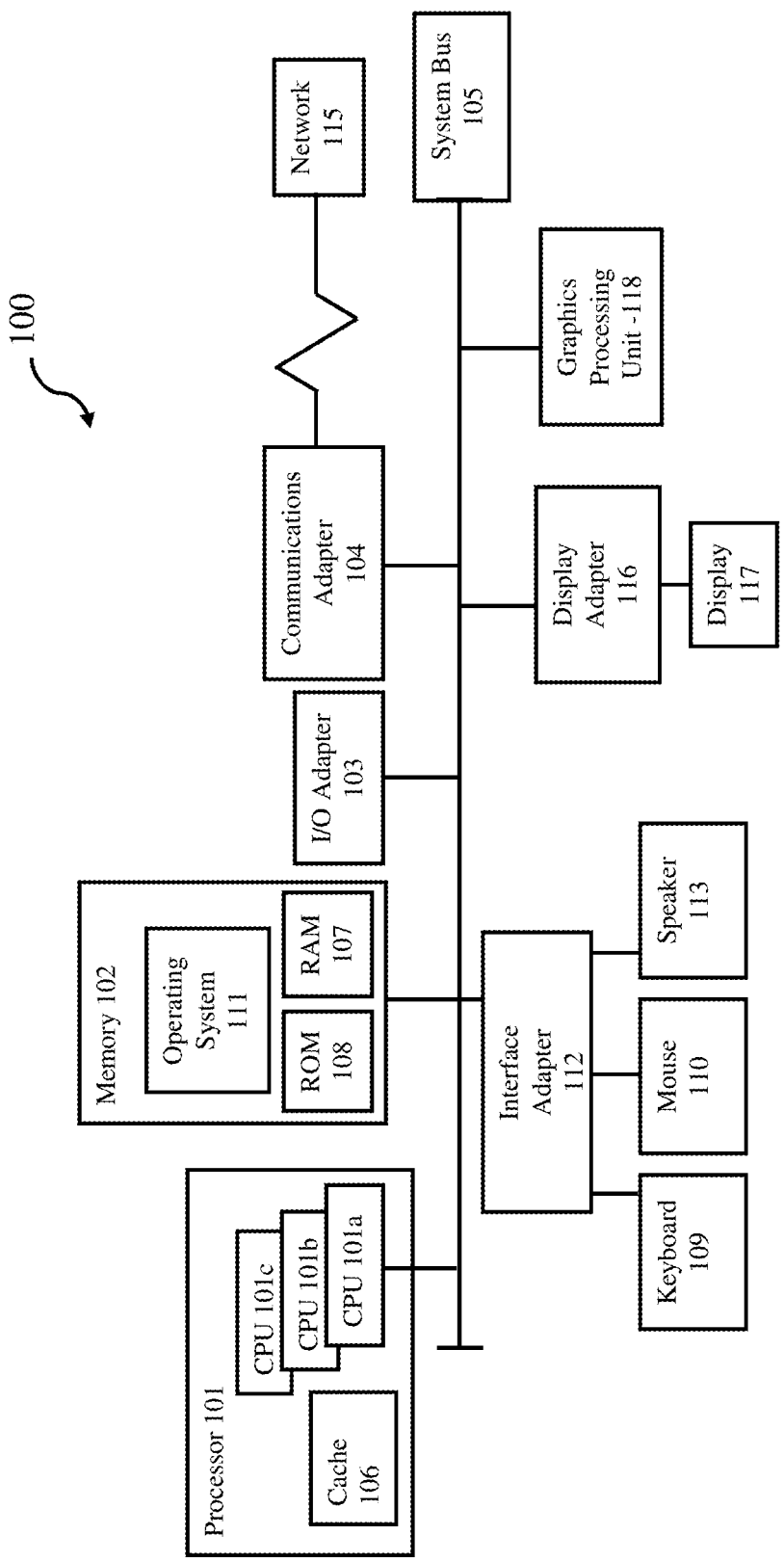
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Memory 102 may be operatively coupled to one or more internal or external memory devices. Communications adaptor 104 may be operatively connect computer 100 to one or more networks 115. System bus 105 may also connect one or more user interfaces via interface adaptor 112. Interface adaptor 112 may connect a plurality of user interfaces to computer 100 including, for example, keyboard 109, mouse 110, speaker 113, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a field programmable gate array (FPGA), a central processing unit (CPU), a plurality of CPUs, for example, CPU 101a-101c, an auxiliary processor among several other processors associated with the computer 100, a semiconductor based microprocessor (in the form of a microchip or chip set), or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 111. Operating system 111 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 110. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 115.

Network 115 can be an internet protocol (IP)-based network for communication between computer 100 and any external device. Network 115 transmits and receives data between computer 100 and devices and/or systems external to computer 100. In an exemplary embodiment, network 115 can be a managed IP network administered by a service provider. Network 115 may be a network internal to an aircraft, such as, for example, an avionics network, etc. Network 115 may be implemented in a wireless fashion, e.g., using wireless protocols and technologies, such as WiFi, WiMax, etc. Network 115 may also be a wired network, e.g., an Ethernet network, an ARINC 429 network, a CAN, etc., having any wired connectivity including, e.g., an RS232 connection, R5422 connection, etc. Network 115 can also be a packet-switched network such as a local area network, wide area network, metropolitan area network, Internet network, or other similar type of network environment. The network 115 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

One aim for energy-efficient computer systems has spurred the trend towards heterogeneous computing and massively parallel architectures. Heterogeneous computing systems are generally systems configured to use more than one kind of processor. These types of systems may gain performance by adding dissimilar processors that may incorporate specialized processing capabilities to handle particular tasks. For example, heterogeneous systems often use graphics processing units (GPUs) and other types of co-processors to accelerate applications. It has been shown that accelerators may provide much better energy-efficiency compared to traditional CPUs.

Current single-instruction multiple data (SIMD)-based accelerators may not be suited to handle tasks that do not expose well-structured data-level parallelism. Field Programmable Gate Arrays (FPGAs), in contrast, offer very different opportunities to make use of low-level parallelism. By customizing a data path to the requirements of a specific algorithm, FPGAs can exploit temporal and spatial locality much more directly than instruction-based processors which is particularly favorable in terms of power consumption.

While it has been shown that FPGAs can yield tremendous gains in performance and, especially with respect to energy efficiency, their adoption in data centers and high performance computing (HPC) facilities has been limited in the past. This is mainly due to the lack of high-level language programming tools. In recent years, significant attention has been paid on design productivity for FPGAs and modern high-level synthesis tools now enable the automatic generation of hardware accelerators from C-level languages. Larger data centers may now use FPGAs in their production data centers, and leading server chip providers may also now integrate FPGAs with their high-performance CPUs via cache coherent, low-latency interconnects. However, current FPGA-driven systems may not be configured for hardware acceleration with respect to sparse matrix processing.

Among the key workloads that could profit from hardware acceleration is graph-based data mining. Many real world big data sets may have a graph structure (e.g., the Internet structure, social interactions, or scientific data) which can itself be represented as sparse matrix. A sparse matrix is a matrix in which most of the elements are zero. By contrast, if most of the elements are nonzero, then the matrix is considered dense. The fraction of non-zero elements over the total number of elements (e.g., that can fit into the matrix, say a matrix of dimension of m×n can accommodate m×n total number of elements) in a matrix is called the sparsity (density).

Sparse matrix-vector (SpMV) and sparse matrix dense matrix (SpMM) multiplications are frequently the workhorse in most algorithms operating on sparse data sets, such as iterative methods for linear systems solving, eigenvalue problems, and graph traversal. Although SpMV architecture has played an important role in many applications, SpMV is also widely known for its poor performance on modern multicore CPUs. SpMV is an example of a computational kernel generally suited for low arithmetic intensity. The workload may be bounded by memory traffic and may typically achieve only a fraction of the CPU's theoretical peak performance. Accordingly, the SpMV kernel may sometimes be a computational bottleneck in applications from domains such as scientific computing, engineering, financial modeling, and information retrieval.

The motivation for the development and optimization of a multitude of matrix formats and implementations lies in the inherent challenges posed by the sparse matrix multiplication operation. One main problem is the very low arithmetic intensity caused by the lack of temporal locality in the accesses to the sparse matrix and only marginal spatial locality in the accesses to the right-hand side (RHS) x. In the SpMV algorithm, each value in A is used only once in the computation and, if the sparse matrix is not structured or blocked, most of the entries in a cache line fetched to get an element in x remain unused. Both characteristics can lead to cache pollution and to a high memory overhead per floating point operation. Some disclosed embodiments may work on the prevalent Compressed Sparse Row (CSR) format. All described methods analogously work with the Compressed Sparse Column (CSC) format. Other formats may be functional with formatting modifications.

Another problem is the indirect and irregular memory access to the RHS data. The elements of x may be accessed based on the column identifications of the values in A, and thus, they may be strongly dependent on the sparsity structure of the matrix. Such data dependencies may be detrimental to static compiler optimization (e.g., loop unrolling and vectorization) because there is (if not enforced by a special matrix format) no information about consecutive column indices at compile time.

Sparse matrix dense matrix multiplication (SpMM) is a generalization of SpMV in which a sparse matrix A is multiplied by a typically tall and narrow dense matrix X. Many applications that originally rely on SpMV can be transformed to use SpMM, for example by combining multiple independent SpMV operations into one SpMM operation. SpMM mitigates some of the aforementioned problems of SpMV. The arithmetic intensity increases because the values of A are now multiplied with an entire row of the RHS matrix X and the spatial locality enables vectorization.

Computing dot-products is at the core of every vector multiplication algorithm. In dot-product operations, two lists of numbers of equal length are multiplied element-by-element and the sum over all products is return as the result. In the sparse case, the two lists of elements are 1) a contiguous part of the A-values array, such as, for example, $A[i:i+1]$, and 2) a subset of the RHS x-vector as defined by $J[i:i+1]$. $A[i:i+1]$ is a vector of length 1. Accordingly, the correct access pattern for a CSR matrix is $A[I[i]I[i+1]-1]$. In some aspects, the subset of the RHS x vector is generally non-contiguous.

An efficient matrix multiplication architecture may include two principle steps: (1) Fetching the data out of memory in the most efficient way, and (2) computing inner operations with the least amount of instructions. FPGAs are used to perform the computation by chaining multiple elementary operations into a pipeline. However, floating point accumulation has been difficult using conventional FPGA technology because floating point operations are usually pipelined to achieve higher clock frequencies. If the floating point adder takes k cycles, we can only issue an instruction of type "acc+=y" every k cycles. Conventional approaches for pipelined accumulation on FPGA may be less than optimal because they either introduce latency or introduce an area overhead. FPGA architectures for the SpMV kernel may use variants of the accumulator circuits to hide the pipelined adder latency.

Other conventional approaches may use a SME algorithm to compute the diagonal of the exponent of an adjacency matrix of the graph, the so-called subgraph-centralities of the nodes of the graph. At its core, this method is based on computing truncated Lanczos decompositions of the adjacency matrix, which rely on the fast evaluation of SpMV. The SpMV operation is a special kind of SpMM operation, where the right-hand side matrix has a column-width of one. This specific case has the lowest arithmetic density of a general SpMM and will thus suffer very poor performance with regard to energy consumption.

Accordingly, it may be advantageous to provide systems, methods and apparatus that enhance performance by increasing arithmetic density by widening the column-width of the right-hand side matrix. It may also advantageous to provide a special purpose FPGA configured for a low energy foot-print for the SpMM.

To these ends, some embodiments may apply a technique known as c-slowing to compensate for the delay. In some aspects, a k-staged pipelined first-in-first-out module may interleave k-stages. Thus, threads $t_0$ to $t_{k-1}$ can be simultaneously active at a time. The numbers in brackets reflect the matrix elements. According to some embodiments first result of thread $t_0[0]$ may be ready one cycle after the first input of thread $t_{k-1}[0]$ is fed into the pipeline. That means the first result of thread $t_0[0]$ can be combined with the next input of thread $t_0[1]$ in that cycle.

Accordingly, transforming the application to use SpMM kernels (instead of SpMV) may result in a data-level parallelism that could be explored by SIMD techniques. According to some exemplary embodiments, only a single FPGA module may be needed to perform the SpMM architecture described herein. Instead of exploring the data-level parallelism (by parallel vector operations), some embodiments may compute the data items in a sequentially interleaved fashion in order to fully saturate the compute units. Going from vector to matrix right-hand-sides may also be beneficial because it allows for fetching and using full bursts out of DDR memory. In some aspects the SpMM architecture may also optimize computing solutions to Orthogonal Polynomial Expansion problems.

Figure 2:
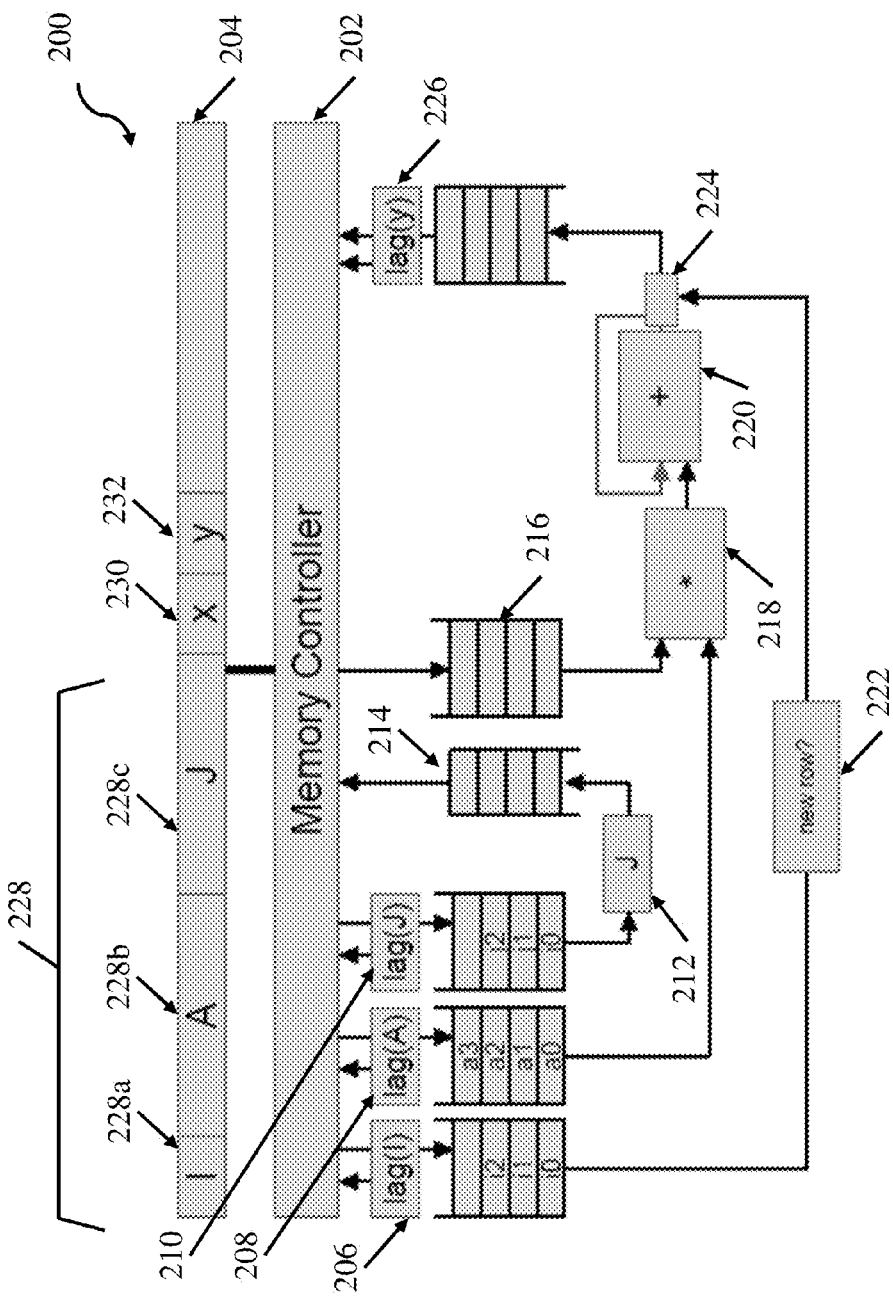
FIG. 2 depicts conventional sparse matrix-vector (SpMV) computing architecture on a single FPGA module.

Referring now to FIG. 2, a conventional sparse matrix-vector (SpMV) computing architecture 200 is depicted. Conventional SpMV architecture 200, which exists currently in the art, may include a memory controller 202 configured to access accelerator memory 204. Memory controller 202 may be operatively connected with a plurality of linear address generators 206, 208, 210, and 226. Memory controller 202 may receive values to and receive values from linear address generators 206, 208, 210, and 226. Memory controller 202 may also receive values from request queue 214. Request queue 214 may receive values from field J 212, which may be configured to fetch elements from x. The elements fetched from x may be fed to FIFO 216.

FIFO 216 is generally configured to serially feed vector values to multiplier 218, where the serially fed values from FIFO 216 may be multiplied with serially fed A elements from a linear address generator 208. Conventional FIFOs embodied in FPGAs are configured to process single (e.g., k=1) threads. Accordingly, multiplier 218 may be configured to feed values to accumulator 220.

Accumulator 220 may be configured to generate an accumulated value 224, which may be combined with a new row value 222 and fed back into accumulator 220 that counts the computed elements. If an end of a row is reached, accumulator 220 generally passes the result Y[i] into the write back queue and accumulator 220 is reset. Linear address generator 226 may be configured to receive the accumulated values 224.

Fields I, A, and J (fields 228a, 228b, and 228c, respectively) represent values for a sparse matrix in CSR format (collectively matrix fields 228). The right hand side vector x 230 and the result vector y 232 are generally located in accelerator memory 204. In most conventional architectures, such as in conventional SpMV architecture 200, values stored in matrix fields A, J, and I 228 are "consumed" in a linear manner. In other words, they get read into memory in order and are used once. Similarly, the result vector y 232 is written in a linear fashion and used only once.

With most conventional SpMV architectures (such as conventional SpMV architecture 200), J field 228c specifies the column in which a value (in field A 228b) is located in the matrix. This column identification may be used to indirectly address right hand side vector x 230. For example, if A[0] is in column 5, memory controller 202 needs to fetch x[5] from memory to compute A[0]*x[5].

In the case of floating-point data in conventional computing systems, the most critical part of the processing pipeline is the final accumulator stage. A single-cycle floating-point adder may run at a very low frequency and would compromise performance. In contrast, a pipelined adder can be clocked much faster but, when it is used as an accumulator (e.g., as is accumulator 220), it may need to block the inputs for multiple cycles in order to wait for the current summation result. For example, a pipeline operator allows memory controller 202 to feed in any pair of operands in a cycle, but memory controller 202 must wait for 7-13 cycles until a result is calculated. Moreover, memory controller 202 must save each result (e.g., value 224) for several cycles before feeding the results back into accumulator 220.

As previously mentioned, one main problem of SpMV architecture is low arithmetic intensity. Low arithmetic intensity (i.e., the ratio of compute instructions and memory load/store operations) may be caused by the lack of temporal locality. In the SpMV algorithm, each value in A is used only once in the computation and, if the sparse matrix is not structured or blocked, most of the entries in a cache line are fetched. The element in x remains unused. Both characteristics may lead to cache pollution and to a high memory overhead per floating point operation.

Figure 3:
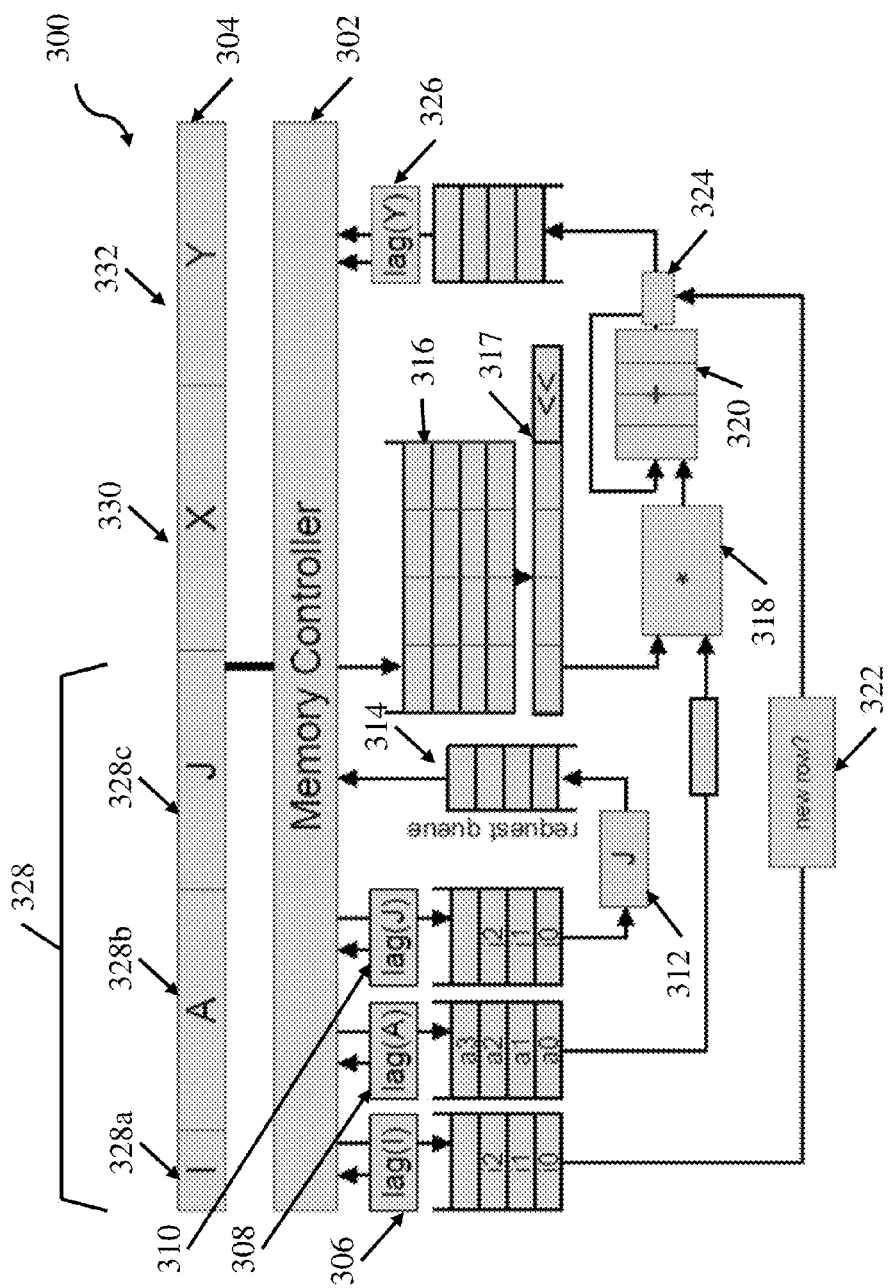
FIG. 3 depicts a sparse matrix-dense-matrix multiplication (SpMM) architecture with c-slowing in accordance with an exemplary embodiment.

Another problem with SpMV architecture is the indirect and irregular memory access to the RHS data. The elements of x are accessed based on the column identifications (J field 228c) of the values in A, and thus, strongly dependent on the sparsity structure of the matrix. Such data dependencies can be detrimental to static compiler optimization due to, for example, loop unrolling and vectorization, because there may be no information about consecutive column indices at compile time. It may be advantageous, therefore, to provide a sparse matrix-dense-matrix multiplication (SpMM) architecture configured to compensate for the compile time differential. Generally speaking, SpMV architecture may multiply a sparse matrix A by a typically tall and narrow dense matrix B. Many applications that originally rely on SpMV can be transformed to use SpMM by combining multiple independent SpMV operations into one SpMM operation. Accordingly, SpMM may mitigate some of the aforementioned problems of SpMV. For example, the arithmetic intensity may be increased because the values of A can now be multiplied with an entire row of the RHS x, and the spatial locality enables vectorization of the values. FIG. 3 depicts a SpMM architecture with c-slowing 300, which may provide optimized sparse matrix dense matrix (SpMM) multiplication using a field programmable gate array (FPGA).

Referring now to FIG. 3, SpMM architecture with c-slowing 300 (hereafter "architecture 300") is depicted, according to some embodiments. Architecture 300 may include a memory controller 302, which may be configured to access accelerator memory 304. Memory controller 302 may be operatively connected with a plurality of linear address generators 306, 308, 310, and 326. Memory controller 302 may receive values to and receive values from linear address generators 306, 308, 310, and 326. Memory controller 302 may also receive values from request queue 314. Request queue 314 may receive values from field J 312, which may be configured to fetch elements from x. The elements fetched from X may be fed to a first-in-first-out register (FIFO) 316. However, in comparison with conventional SpMV architecture 200, X is no longer a single vector but rather an entire matrix X. According to embodiments disclosed herein, FIFO 316 may include a plurality of k-stage pipelines configured to process k-stage interleaved threads simultaneously. Accordingly, the pipeline for FIFO 316 for X elements may include multiple entries.

FIFO 316 may be configured feed matrix X values to multiplier 318, where the serially fed values from FIFO 316 are multiplied with pipelined A elements from linear address generator 308. A shifter unit 317 can shift the present subset of the RHS row by one element per cycle and feed values to multiplier 318. Multiplier 318 may be configured to feed values to adder 320. Adder 320 may be configured to generate an accumulated output 324. Output 324 may be combined with a new row value 322 and fed back into adder 320, which may count the computed elements. If an end of a row is reached, adder 320 may pass the result Y[i] into the write back queue, and adder 320 may be reset. Linear address generator 326 may be configured to receive output values 324. Fields I, A, and J (fields 328a, 328b, and 328c, respectively) represent values for a sparse matrix (collectively matrix fields 328). The right hand side matrix X 330 and the result vector y 332 can be located in accelerator memory 304.

SpMM architecture may provide for numerous computing optimizations. Some of them may apply to both CPUs and GPUs, including FPGAs. Architecture 300 may be configured on a single FPGA module, and may be configured for c-slowing to compensate for accumulator delay associated with FPGA processing. C-slowing is a technique used in conjunction with retiming to improve throughput of a digital circuit. Each register in a circuit may be replaced by a set of C registers (in series). This creates a circuit with C independent threads, as if the new circuit contained C copies of the original circuit. A single computation of the original circuit takes C times as many clock cycles to compute in the new circuit. C-slowing by itself increases latency, but throughput remains the same. Increasing the number of registers allows optimization of the circuit through retiming to reduce the clock period of the circuit. In the best case, the clock period can be reduced by a factor of C. Reducing the clock period of the circuit reduces latency and increases throughput. Thus, for computations that can be multi-threaded, combining C-slowing with retiming can increase the throughput of the circuit, with little, or in the best case, no increase in latency.

According to some embodiments, memory controller 302 can use the "wide right hand side" available in FPGA architecture to compensate the accumulator delay. For the simplicity of explanation, an adder delay of 4 cycles is used and a width of n=4 for a dense matrix X. Those skilled in the art appreciate that current FPGAs may include a typical delay of 7-12 clock cycles. It should be appreciated that, although a width of n=4 is described herein, any width is contemplated.

In one embodiment, an inner loop of a compressed row storage (CRS) algorithm may include, for example, for (p=0;p<n;p++)Y[i][p]+=A[j]*X[J[j]][p], where X is a dense matrix, p is pipeline index, n is a width of dense matrix X, and i is a row index. In some aspects, we can unroll the loop to demonstrate an application of c-slowing. In some embodiments, the inner loop of the CRS algorithm may include the following algorithm, which is unrolled for our case n=4 and 4 non-zero elements in row i:

t00: Y[i][0]+=A[j]*X[J[j]][0]//A[j] and X[J[j]][0] enter multiplier
t01: Y[i][1]+=A[j]*X[J[j]][1]//A[j] and X[J[j]][1] enter multiplier
t02: Y[i][2]+=A[j]*X[J[j]][2]//A[j] and X[J[j]][2] enter multiplier
t03: Y[i][3]+=A[j]*X[J[j]][3]//A[j] and X[J[j]][3] enter multiplier
t04: Y[i][0]+=A[j]*X[J[j+1]][0]//A[j]*X[J[j]][0] exits multiplier, A[j]*X[J[j]][0] and 0 enters adder
t05: Y[i][1]+=A[j]*X[J[j+1]][1]//A[j]*X[J[j]][1] exits multiplier, A[j]*X[J[j]][1] and 0 enters adder
t06: Y[i][2]+=A[j]*X[J[j+1]][2]//A[j]*X[J[j]][2] exits multiplier, A[j]*X[J[j]][2] and 0 enters adder
t07: Y[i][3]+=A[j]*X[J[j+1]][3]//A[j]*X[J[j]][3] exits multiplier, A[j]*X[J[j]][3] and 0 enters adder
t08: Y[i][0]+=A[j]*X[J[j+2]][0]//A[j]*X[J[j]][0]+0 exits adder, A[j+1]*X[J[j+1]][0] exits multiplier
t09: Y[i][1]+=A[j]*X[J[j+2]][1]//A[j]*X[J[j]][1]+0 exits adder, A[j+1]*X[J[j+1]][1] exits multiplier
t10: Y[i][2]+=A[j]*X[J[j+2]][2]//A[j]*X[J[j]][2]+0 exits adder, A[j+1]*X[J[j+1]][2] exits multiplier
t12: Y[i][3]+=A[j]*X[J[j+2]][3]//A[j]*X[J[j]][3]+0 exits adder, A[j+1]*X[J[j+1]][3] exits multiplier
t13: Y[i][0]+=A[j]*X[J[j+3]][0]//A[j]*X[J[j]][0]+A[j]*X[J[j+1]][0] exits adder, . . .
t14: Y[i][1]+=A[j]*X[J[j+3]][1]//A[j]*X[J[j]][0]+A[j]*X[J[j+1]][0] exits adder, . . .
t15: Y[i][2]+=A[j]*X[J[j+3]][2]//A[j]*X[J[j]][0]+A[j]*X[J[j+1]][0] exits adder, . . .
t16: Y[i][3]+=A[j]*X[J[j+3]][3]//A[j]*X[J[j]][0]+A[j]*X[J[j+1]][0] exits adder, . . .

where t00-to are clock cycles. According to some embodiments, this technique may ideally be applied to circuits implemented with FPGAs, since FPGAs typically include a large number of registers.

According to the above algorithm, it takes 8 cycles to fill the pipeline. After the $8^{th}$ cycle the first partial sum $$A[j]*X[J[j]][0]+0$$

is ready at the output at the adder 320. In the same cycle, the next product $$A[j+1]*X[J[j+1]][0]$$

is ready at the out port (not shown) of multiplier 318. Thus, memory controller 302 can directly pass output 324 of adder 320 to the adder 320 input, and accumulate the next value for the 0-column of matrix X.

In cycle t9, memory controller 302 can directly pass output 324 of adder 320 to the adder input, and accumulate the next value for the column 1.

In cycle t10, memory controller 302 can directly pass the output 324 of adder 320 to the adder input, and accumulate the next value for the column 2.

In cycle t11, memory controller 302 can directly pass the output 324 of adder 320 to the adder input, and accumulate the next value for the column 3.

In cycle t12, the next partial sum for column 0 is ready.

According to the above example, there are constantly 4 independent problem sets in the pipeline. According to other embodiments, it is possible to match the pipeline depth with the width of X, which may have any number of values according to the particular embodiment. The above algorithm, as implemented in architecture 300, may be scaled to have any number of k-state threads. Accordingly, architecture 300 may interleave k-stage threads on the k-stage pipeline. Thus, threads $t_0$ to $t_{k-1}$ can be simultaneously active at a time. The numbers in brackets reflect the matrix elements. According to some embodiments first result of thread $t_0[0]$ may be ready one cycle after the first input of thread $t_{k-1}[0]$ is fed into the pipeline. That means the first result of thread $t_0[0]$ can be combined with the next input of thread $t_0[1]$ in that cycle.

Figure 4:
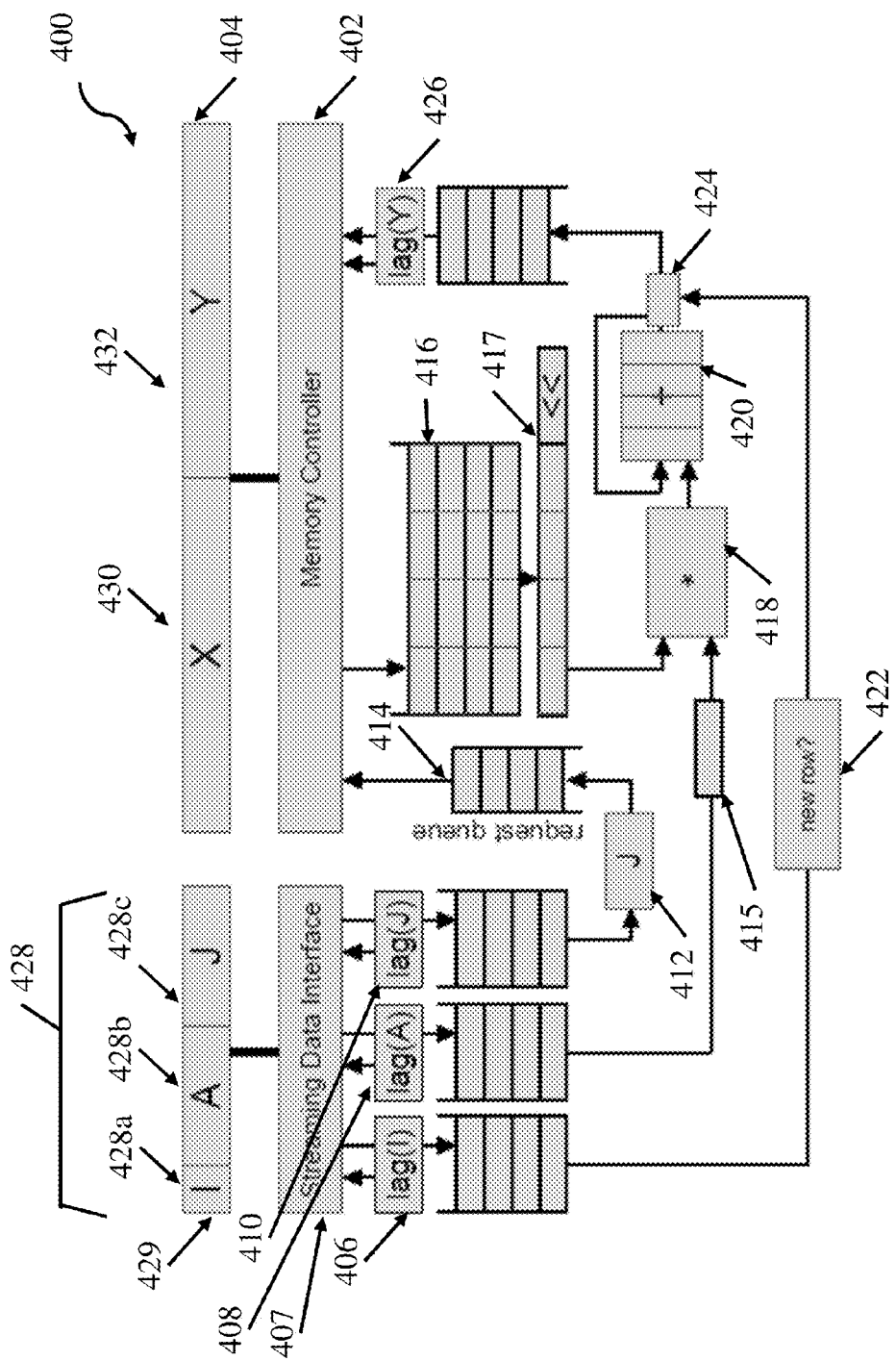
FIG. 4 depicts a SpMM architecture in accordance with an exemplary embodiment.

FIG. 4 depicts SpMM architecture 400, in accordance with an exemplary embodiment. Referring now to FIG. 4, SpMM architecture 400 (hereafter "architecture 400") may include a memory controller 402, which may be configured to access accelerator memory 404. Memory controller 402 may be operatively connected with linear address generator 426.

Architecture 400 may further include a streaming data interface 407, which may be configured to receive matrix values from a streaming memory 409 and stream the values to and from linear address generators 406, 408, and 410. According to some embodiments, it may be advantageous to provide a non-unified memory having a streaming data interface. As the different fields used to store the dense and sparse matrices have different access patterns a non-unifed memory architecture might be beneficial. For example, the regularly accessed fields used to store the sparse A matrix can be mapped to a memory that efficiently supports wide accesses and the randomly accessed (dense) X matrix might be mapped to a memory technology that supports efficient random accesses.]. In some aspects, streaming data interface 407 may be configured to provide optimized streaming of values to and from linear address generators 406, 408, and 410. Streaming data interface 407 may interface with streaming memory 409, which may include fast random-access capabilities. Fields I, A, and J (fields 428a, 428b, and 428c, respectively) represent values for a sparse matrix (collectively matrix fields 428, which are stored in a computer memory). The right hand side matrix X 430 and the result vector y 432 can be located in accelerator memory 404.

Memory controller 402 may receive values from request queue 414. Request queue 414 may receive values from field J 412, which may be configured to fetch elements from x. The elements fetched from x may be fed to a first-in-first-out register (FIFO) 416. However, in comparison with conventional SpMV architecture 200, X is no longer a single vector but rather an entire matrix X. According to embodiments disclosed herein, FIFO 416 may include a plurality of k-stage pipelines configured to process k-stage interleaved threads simultaneously. Accordingly, the pipeline for FIFO 416 for x elements may include multiple entries.

FIFO 416 may be configured feed matrix X values to multiplier 418, where the serially fed values from FIFO 416 are multiplied with pipelined A elements from linear address generator 408. Shifter unit 417 can shift the present subset of the RHS row by one element per cycle and feed matrix values 415 to multiplier 418. Multiplier 418 may be configured to multiply values 415 and the input from shifter unit 417, and feed the product values to accumulator 420. Accumulator 420 may be configured to generate an accumulated value 424. According to some embodiments, accumulated value 424 may be combined with a new row value 422 and fed back into accumulator 420, which counts the computed elements. If an end of a row is reached, accumulator 420 can pass the result Y[i] into the write back queue (linear address generator 426), and accumulator 420 may be reset.

Figure 5:
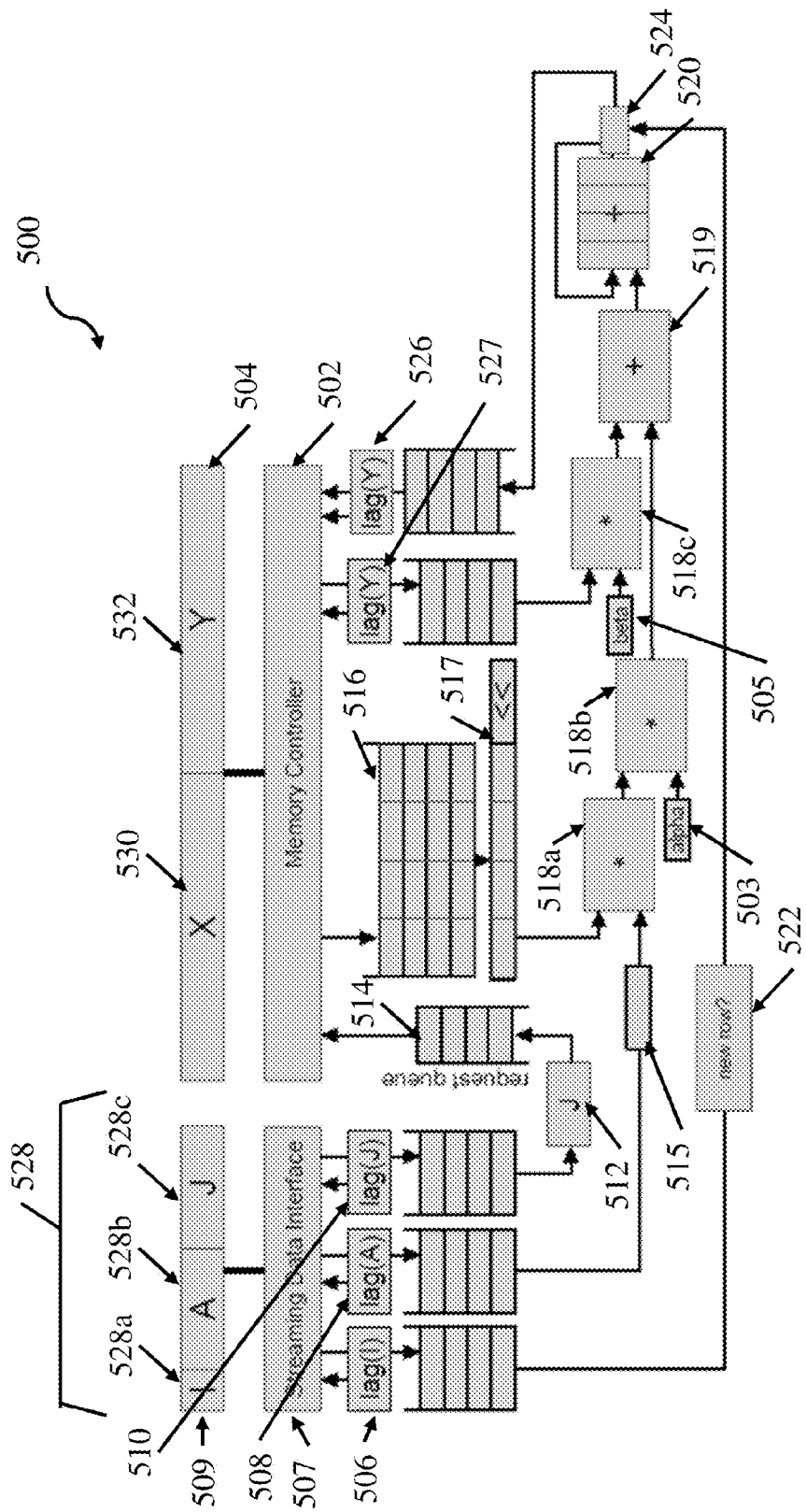
FIG. 5 depicts a SpMM architecture with non-unified memory in accordance with an exemplary embodiment.

FIG. 5 depicts a Basic Linear Algebra Subprograms (BLAS) compliant SpMM architecture 500, in accordance with an exemplary embodiment. BLAS is a specification that prescribes a set of low-level routines for performing common linear algebra operations such as vector addition, scalar multiplication, dot products, linear combinations, and matrix multiplication. Although the BLAS specification is general, BLAS implementations are often optimized for speed on a particular machine, so using them can bring substantial performance benefits. BLAS implementations may take advantage of special floating point hardware such as vector registers. According to some embodiments, it may be advantageous to provide SpMM architecture configured to be BLAS compatible.

Referring now to FIG. 5, BLAS compliant SpMM architecture 500 may include a memory controller 502, which may be configured to access accelerator memory 504. Memory controller 502 may be operatively connected with linear address generator 526. Previous embodiments have described architecture configured to compute a matrix Y=AX. A more general (BLAS compliant) routine for Matrix-Matrix multiplication is Y=alpha*AX+beta*Y. According to some embodiments, architecture 500 can extend the pipeline by adding new operators and two additional registers that include alpha register 503, and beta register 505, which may be configured with predetermined constant values for both alpha and beta. Alpha register 503 may be configured to provide a predetermined alpha value to multiplier 518b. Alpha register 505 may be configured to provide a predetermined beta value to multiplier 518c.

Architecture 500 may further include a streaming data interface 507, which may be configured to receive matrix values from a streaming memory 509 and stream the values to and from linear address generators 506, 508, and 510. In some aspects, streaming data interface 507 may be configured to provide optimized streaming of matrix values to and from linear address generators 506, 508, and 510. According to some embodiments, streaming data interface 507 may interface with streaming memory 509, which may include fast random-access capabilities. Fields I, A, and J (fields 528a, 528b, and 528c, respectively) represent values for a sparse matrix (collectively matrix fields 528, which are stored in a computer memory (e.g., streaming memory 509). The right hand side matrix X 530 and the result vector y 532 can be located in accelerator memory 504.

Memory controller 502 may receive values from request queue 514. Request queue 514 may receive values from field J 512, which may be configured to fetch elements from x. The elements fetched from X may be fed to first-in-first-out register a FIFO 516. However, in comparison with conventional SpMV architecture 200, X is again no longer a single vector but rather an entire matrix X. According to embodiments disclosed herein, FIFO 516 may include a plurality of k-stage pipelines configured to process k-stage interleaved threads simultaneously. Accordingly, the pipeline for FIFO 516 for X elements may include multiple entries.

FIFO 516 may be configured feed matrix X values to multiplier 518, where the serially fed values from FIFO 516 are multiplied with pipelined A elements from linear address generator 508. Shifter unit 517 can shift the present subset of the RHS row by one element per cycle and feed matrix values 515 to multiplier 518a. Multiplier 518a may be configured to multiply values 515 and the output from shifter unit 517, and feed the product values to multiplier 518b. In some embodiments, multiplier 518b may multiply a predetermined alpha value from alpha register 503 with the output product value from accumulator 518a, and then feed the product values to accumulator 519.

Multiplier 518c may be configured to multiply a predetermined beta value from beta register 505 with the output from linear address generator 527, and provide product value to accumulator 519.

Accumulator 519 may also receive an output from multiplier 518b, add the values, and provide a sum to accumulator 520. Accumulator 520 may be configured to generate an accumulated value 524. According to some embodiments, accumulated value 524 may be combined with a new row value 522 and fed back into accumulator 520, which counts the computed elements. If an end of a row is reached, accumulator 520 may pass the result Y[i] into the write back queue and accumulator 520 is reset. Linear address generator 526 may be configured to receive the accumulated values 524.

Figure 6:
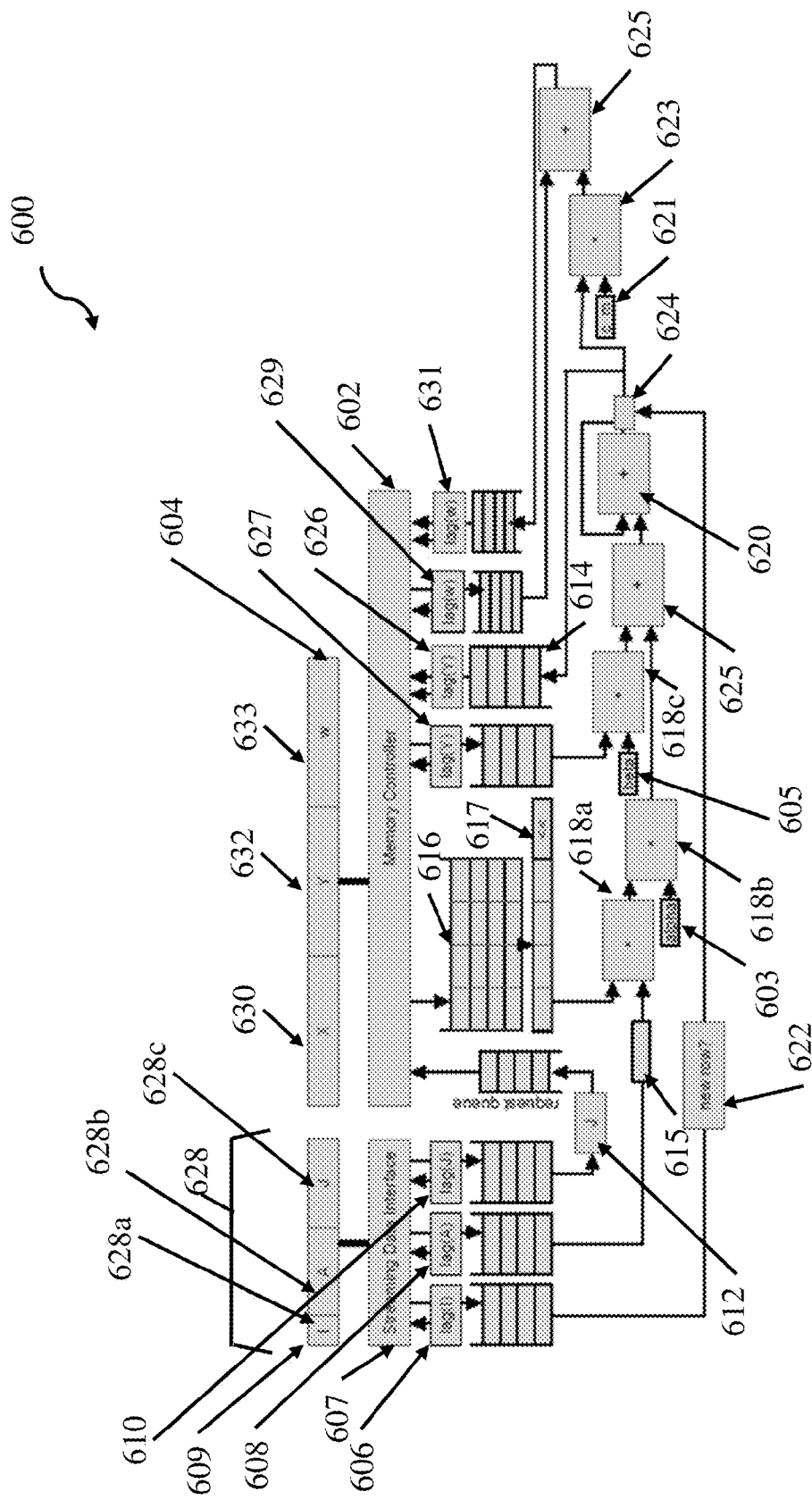
FIG. 6 depicts a full SpMM architecture in accordance with an exemplary embodiment.

FIG. 6 depicts orthogonal polynomial expansion SpMM architecture 600, in accordance with some embodiments. Architecture 600 may be configured for performing orthogonal polynomial expansion operations using FPGA architecture. For orthogonal polynomial expansion memory controller 602 may be configured compute the following two operations in an iterative fashion:

$$Y = 2.0 * AX - Y, \text{ and} \quad (1)$$

$$W=c*Y+W \text{ (sometimes referred to as "AXPY"—alpha times } X \text{ plus } Y\text{))}. \qquad (2)$$

Architecture 600 may include a memory controller 602, which may be configured to access accelerator memory 604. Memory controller 602 may be operatively connected with linear address generators 626, 627, 629, and 631.

According to some embodiments, architecture 600 can further extend the pipeline by adding new operators and three additional registers including an alpha register 603, a beta register 605, and a c register 621c, which may be preconfigured with predetermined constant values for alpha, beta and c before, respectively. Alpha register 603 may be configured to provide a predetermined alpha value to multiplier 618b. Alpha register 605 may be configured to provide a predetermined beta value to multiplier 618c. C register 621 may be configured to provide a predetermined c value to a multiplier 623.

Architecture 600 may further include a streaming data interface 607, which may be configured to receive matrix values from a streaming memory 609 and stream the values to and from linear address generators 606, 608, and 610. Fields I, A, and J (fields 628a, 628b, and 628c, respectively) represent values for a sparse matrix (collectively matrix fields 628, which are stored in a computer memory, e.g., streaming memory 609). The right hand side matrix values X 630 and the result vector Y 632 can be located in accelerator memory 504.

In some aspects, memory controller 602 may receive values from request queue 614. Request queue 614 may receive values from field J 612, which may be configured to fetch elements from X. The elements fetched from X may be fed to a first-in-first-out register (FIFO) 616. However, in comparison with conventional SpMV architecture 200, X is no longer a single vector but rather an entire matrix X. According to embodiments disclosed herein, FIFO 616 may include a plurality of k-stage pipelines configured to process k-stage interleaved threads simultaneously. Accordingly, the pipeline for FIFO 616 for X elements may include multiple entries.

FIFO 616 may be configured feed matrix X values to multiplier 618, where the serially fed values from FIFO 616 are multiplied with pipelined A elements from linear address generator 608. Shifter unit 617 can shift the present subset of the RHS row by one element per cycle] and feed matrix values 615 to multiplier 618a.

Multiplier 618a may be configured to multiply values 615, which are output from linear address generator 608, and the output from shifter unit 617. Multiplier 618a may feed the product values to multiplier 618b. In some embodiments, multiplier 618b may multiply a predetermined alpha value from alpha register 603 with the output product value from multiplier 618a, and then feed the product values to accumulator 625.

Multiplier 618c may be configured to multiply a predetermined beta value from beta register 605 with the output from linear address generator 627, and provide product value to accumulator 625.

Accumulator 625 may also receive an output from multiplier 618b, add the values, and provide a sum to accumulator 620.

Accumulator 620 may be configured to generate an accumulated value 624. According to some embodiments, accumulated value 624 may be combined with a new row value 622 and fed back into accumulator 620, which counts the computed elements. If an end of a row is reached, accumulator 620 may pass the result Y[i] into the write back queue and accumulator 620 is reset. Linear address generator 626 may be configured to receive the result for Y. At the same time, multiplier 623 may also receive the result for Y. Multiplier 623 may next multiply the result for Y with the predetermined c value from c register 621, and provide the product to accumulator 625.

Accumulator 625 may be configured to accumulate the output from multiplier 623 with output from linear address generator 629, and update the values for w at linear address generator 631. According to some embodiments, memory controller 602 may switch pointers to X and y after each iteration.

In some aspects, for orthogonal polynomial expansion operations the predetermined value for alpha register 603 may be 2.0, and the predetermined value for beta register 605 may be 1.0.

Figure 7:
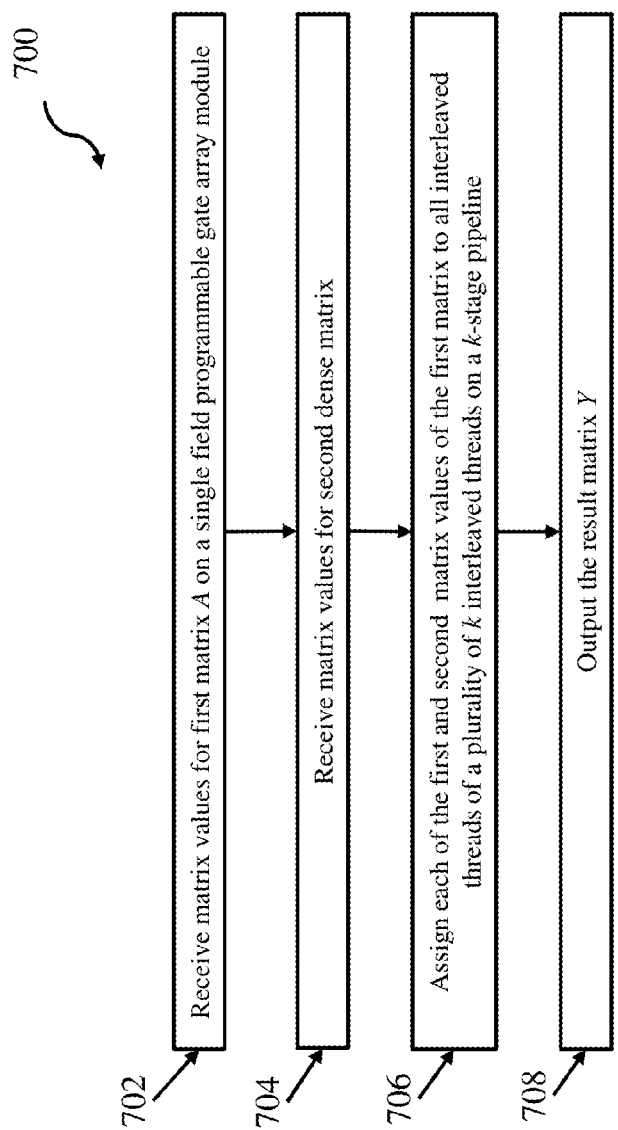
FIG. 7 depicts a full SpMM architecture configured for performing orthogonal polynomial expansion in accordance with an exemplary embodiment.

FIG. 7 depicts a flow diagram of a method 700 for performing sparse matrix dense matrix multiplication using a single field programmable gate array (FPGA), in accordance with an exemplary embodiment. Referring now to FIG. 7, as shown in block 702, a memory controller (e.g., memory controller 302, 402, 502, and/or 602) may receive a plurality of matrix values for a first matrix on a single FPGA module. As shown in block 704, the memory controller may receive matrix values for a second matrix at the single FPGA. The second matrix may be a dense matrix. The memory controller may next assign each of the first and second matrix values to an interleaved thread of a plurality of k interleaved threads on a k-stage pipeline, as shown at block 706. The memory controller may then output the first result for the thread k[0] one cycle after the input for the thread k[1] is passed to the single FPGA.

According to some embodiments, a plurality of SpMM modules may be instantiated on a single device. Accordingly, the plurality of modules may be configured to compute a single matrix operation (sparse matrix dense matrix multiplication, BLAS compliant SpMM, and/or an orthogonal expansion) in parallel.

In some aspects, the multiple modules may be configured to access the same memory through a shared memory controller. Each of the M modules may be configured to compute N/M rows of the result matrix Y (of size N×Nb). In some embodiments, Nb may be the width of the RHS matrix X, and N may be the number of rows of the sparse matrix A.

According to some embodiments, the assignment of rows to the SpMM modules can be blocked (e.g., module 1 may compute the first N/M rows) or they may be interleaved (e.g., module 1 computes every M-th row starting from row 0). Memory coherency is not a problem because the modules never write to memory locations that are read by other modules in the same operation. Accordingly, matrix A and X are read only. No element of Y is accessed by a multiple modules.

Although the memory controllers are described herein as performing one or more actions, it should be appreciated that any processor described herein may be configured to perform the actions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a non-transitory computer-readable storage medium (or media) having computer-readable program instructions thereon for causing a processor to carry out aspects of the present invention.

The non-transitory computer-readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for performing sparse matrix dense matrix (SpMM) multiplication on a single field programmable gate array (FPGA) module, wherein the SpMM is of the form Y=AX, where X and Y are dense matricies and A is a sparse matrix, comprising a k-stage pipeline, the method comprising:

interleaving k-stage threads on the k-stage pipeline comprising a plurality of threads $t_0$ to $t_{k-1}$, wherein a first result of thread $t_0$ is ready one cycle after a first input of thread $t_{k-1}$ is fed into the pipeline, wherein interleaving comprises:

receiving, at the single FPGA module, a plurality of matrix values of a first matrix A, wherein first matrix A is a sparse matrix stored in a compressed format;

receiving, at the single FPGA module, a plurality of matrix values of a second dense matrix, wherein second dense matrix comprises more than one column of values, wherein the plurality of matrix values of the second dense matrix include all values of the second dense matrix;

assigning each of the matrix values of the first matrix A to all interleaved threads of a plurality of k interleaved threads on the k-stage pipeline;

assigning each of the matrix values of the second dense matrix to an interleaved thread of the plurality of k interleaved threads on the k-stage pipeline such that the first result of thread $t_0$ is ready one cycle after the first input of thread $t_{k-1}$ is fed into the pipeline; and outputting a result matrix Y.

2. The computer-implemented method of claim 1, wherein the k-staged pipeline is a first-in-first-out (FIFO) pipeline configured to update one element of the result matrix Y at each cycle.

3. The computer-implemented method of claim 1, wherein the single FPGA module is configured with a non-unified memory.

4. The computer-implemented method of claim 1, wherein the single FPGA module is configured to be Basic Linear Algebra Subprograms (BLAS) compliant.

5. The computer-implemented method of claim 1, wherein the single FPGA module is configured to perform an orthogonal polynomial expansion on the input, such that the first result of thread $t_0$ is ready one cycle after the first input of thread $t_{k-1}$ is fed into the pipeline.

6. A system for performing sparse matrix dense matrix (SpMM) multiplication, form Y=AX, where X and Y are dense matricies and A is a sparse matrix, comprising:

a single field programmable gate array (FPGA) module;

a k-stage pipeline operating on the FPGA module, the k-stage pipeline configured to process k-stage threads, wherein the single FPGA module is configured to:

receive, at the single FPGA module, a plurality of matrix values of a first matrix A, wherein first matrix A is a sparse matrix stored in a compressed format;

receive, at the single FPGA module, a plurality of matrix values of a second dense matrix, wherein second dense matrix comprises more than one column of values, wherein the plurality of matrix values of the second dense matrix include all values of the second dense matrix;

interleave the k-stage threads on the k-stage pipeline comprising a plurality of threads $t_0$ to $t_{k-1}$, wherein a first result of thread $t_0$ is ready one cycle after a first input of thread $t_{k-1}$ is fed into the pipeline;

assign each of the matrix values of the first matrix A to all interleaved threads of a plurality of k interleaved threads on the k-stage pipeline;

assign each of the matrix values of the second dense matrix to an interleaved thread of the plurality of k interleaved threads on the k-stage pipeline such that the first result of thread $t_0$ is ready one cycle after the first input of thread $t_{k-1}$ is fed into the pipeline; and output a result matrix Y.

7. The system of claim 6, wherein the k-staged pipeline is a first-in-first-out (FIFO) pipeline configured to update one element of the result matrix Y at each cycle.

8. The system of claim 6, wherein the single FPGA module is configured with a non-unified memory.

9. The system of claim 6, wherein the single FPGA module is configured to be Basic Linear Algebra Subprograms (BLAS) compliant.

10. The system of claim 6, wherein the single FPGA module is configured to perform an orthogonal polynomial expansion on the input, such that the first result of thread $t_0$ is ready one cycle after the first input of thread $t_{k-1}$ is fed into the pipeline.

11. A non-transitory computer-readable storage medium storing executable instructions that cause a computer to perform, when executed by the computer, a method for performing sparse matrix dense matrix (SpMM) multiplication on a single field programmable gate array (FPGA) module, wherein the SpMM is of the form Y=AX, where X and Y are dense matricies and A is a sparse matrix, the method comprising:

interleaving a plurality of k-stage threads on a k-stage pipeline comprising a plurality of threads $t_0$ to $t_{k-1}$, wherein a first result of thread $t_0$ is ready one cycle after a first input of thread $t_{k-1}$ is fed into the pipeline, wherein interleaving comprises:

receiving, at the single FPGA module, a plurality of matrix values of a first matrix wherein first matrix A is a sparse matrix stored in a compressed format;

receiving, at the single FPGA module, a plurality of matrix values of a second dense matrix, wherein second dense matrix comprises more than one column of values, wherein the plurality of matrix values of the second dense matrix include all values of the second dense matrix;

assigning each of the matrix values of the first matrix A to all interleaved threads of a plurality of k interleaved threads on the k-stage pipeline;

assigning each of the matrix values of the second dense matrix to an interleaved thread of the plurality of k interleaved threads on the k-stage pipeline such that the first result of thread $t_0$ is ready one cycle after the first input of thread $t_{k-1}$ is fed into the pipeline; and outputting a result matrix Y.

12. The non-transitory computer-readable storage medium of claim 11, wherein the k-staged pipeline is a first-in-first-out (FIFO) pipeline configured to update one element of the result matrix Y at each cycle.

13. The non-transitory computer-readable storage medium of claim 11, wherein the single FPGA module is configured with a non-unified memory.

14. The non-transitory computer-readable storage medium of claim 11, wherein the single FPGA module is configured to be Basic Linear Algebra Subprograms (BLAS) compliant.

15. The non-transitory computer-readable storage medium of claim 11, wherein the single FPGA module is configured to perform an orthogonal polynomial expansion on the input, such that the first result of thread $t_0$ is ready one cycle after the first input of thread $t_{k-1}$ is fed into the pipeline.

* * * * *